(12) United States Patent
Shimizu et al.

(10) Patent No.: US 8,440,287 B2
(45) Date of Patent: May 14, 2013

(54) VEHICLE INTERIOR MATERIAL

(75) Inventors: Toshimitsu Shimizu, Fujimi (JP); Seiji Yoshida, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/499,967

(22) PCT Filed: Jul. 14, 2010

(86) PCT No.: PCT/JP2010/061909
§ 371 (c)(1),
(2), (4) Date: Apr. 3, 2012

(87) PCT Pub. No.: WO2011/043117
PCT Pub. Date: Apr. 14, 2011

(65) Prior Publication Data
US 2012/0196086 A1    Aug. 2, 2012

(30) Foreign Application Priority Data
Oct. 5, 2009 (JP) ................. 2009-231699

(51) Int. Cl.
*B62D 25/14* (2006.01)
*B60R 13/02* (2006.01)
*G02B 1/10* (2006.01)
*G02B 1/11* (2006.01)
*G02B 5/00* (2006.01)

(52) U.S. Cl.
USPC ............ 428/141; 428/156; 296/70; 296/97.2; 296/97.7; 359/582; 359/613; 359/834

(58) Field of Classification Search ................. 428/141, 428/151, 156; 359/613, 834, 582; 296/70, 296/97.2, 97.7
See application file for complete search history.

(56) References Cited

U.S. PATENT DOCUMENTS

| | | | |
|---|---|---|---|
| 3,338,730 A * | 8/1967 | Slade et al. | ................... 428/142 |
| 2006/0006685 A1 | 1/2006 | Shibukawa et al. | |
| 2006/0134381 A1 | 6/2006 | Homburg et al. | |
| 2006/0204720 A1 * | 9/2006 | Biernath et al. | ............. 428/156 |

FOREIGN PATENT DOCUMENTS

| | | |
|---|---|---|
| EP | 0 710 581 A1 | 5/1996 |
| EP | 2 233 366 A1 | 9/2010 |
| JP | 62-268743 A | 11/1987 |
| JP | 3-11211 U | 2/1991 |
| JP | 2006-175863 A | 7/2006 |
| JP | 2007-314909 A | 12/2007 |

OTHER PUBLICATIONS

International Search Report of PCT/JP2010/061909, dated Oct. 12, 2010.

(Continued)

*Primary Examiner* — Maria Veronica Ewald
*Assistant Examiner* — Joanna Pleszczynska
(74) *Attorney, Agent, or Firm* — Westerman, Hattori, Daniels & Adrian, LLP (57) ABSTRACT

A vehicle interior material of the present invention is a vehicle interior material that is disposed in a lower side of windshield glass inside a compartment and includes a grain structure including a concavity and a convexity on the upper face thereof, the vehicle interior material including at the convexity of the grain structure, a diffuse reflection face that is inclined with respect to a general upper face of the grain structure.

3 Claims, 5 Drawing Sheets

OTHER PUBLICATIONS

Japanese Office Action dated Feb. 5, 2013, issued in corresponding Japanese Patent Application No. 2011-535308, w/ English translation.

European Search Report dated Feb. 25, 2013, issued in corresponding European Patent Application No. 10821788.6.

* cited by examiner

VEHICLE INTERIOR MATERIAL

TECHNICAL FIELD

The present invention relates to a vehicle interior material of an instrument panel or the like disposed below a windshield glass inside a compartment, and particularly to a vehicle interior material provided with fine convexities and concavities on the upper surface thereof.

Priority is claimed on Japanese Patent Application No. 2009-231699, filed Oct. 5, 2009, the content of which is incorporated herein by reference.

BACKGROUND ART

Most vehicle interior materials are subject to grain finish with such as a leather pattern, a geometric pattern, or the like, on the surface thereof. The grain finish is performed in order not only to improve design and texture of the surface of an interior material but also to make shrinkage or weld marks on the surface of a product after molding inconspicuous, or the like.

A grain structure provided on the surface of a product includes convexities and concavities provided in predetermined patterns. By appropriately adjusting the quality of materials or the surface roughness of convexities and concavities of a portion constituting the grain structure, it is possible to improve the texture quality of a product and to enhance the durability thereof against abrasion. Generally, it is possible to provide a product with a high texture quality by lowering the surface glossiness of the product to a certain extent. If the surface glossiness is overly lowered, however, there is a tendency that abrasion marks are left on the surface when the surface is abraded, surface whitening occurs, or the like. For this reason, the surface glossiness is adjusted taking balancing these factors into consideration (refer to Patent Document 1).

PRIOR ART DOCUMENTS

Patent Documents

Patent Document 1: Japanese Unexamined Patent Application Publication No. 2007-314909

DISCLOSURE OF INVENTION

Problems to be Solved by the Invention

However, since, in a grain structure that is generally used for the surface of a vehicle interior material, the surface glossiness is adjusted by setting the quality of materials and surface roughness of an interior material, there is a limit on lowering the surface glossiness without reducing durability against abrasion.

Since windshield glass is inclined, in an interior material such as an instrument panel, or the like, that is disposed below the windshield glass of a vehicle, light reflected on the surface of the interior material is incident on the windshield glass again, and projected on the windshield glass. There is a possibility that the projection of the interior material obstructs the visual field of a passenger through the windshield glass, and therefore, further reduction thereof is desired.

In order to reduce such projection from the interior material, lowering surface glossiness of the interior material is effective. However, there is a limit on reducing the surface glossiness as described above, and development of other effective means is desired.

Therefore, the present invention aims to provide a vehicle interior material that is intended to effectively reduce projection onto a windshield glass and improve front visibility.

Means for Solving the Problems

In order to solve the above-described problem, the present invention employs the following measures.

(1) A vehicle interior material according to an embodiment of the invention is a vehicle interior material that is disposed in a lower side of windshield glass inside a compartment and includes a grain structure including a concavity and a convexity on the upper face thereof, the vehicle interior material including at the convexity of the grain structure, a diffuse reflection face that is inclined with respect to the general upper face of the grain structure.

Accordingly, light incident onto the upper face of the vehicle interior material at a certain incidence angle is reflected with a reflection angle that is greater than an incidence angle on the diffuse reflection face of the convexity of the grain structure. For this reason, light reflected from the diffuse reflection face is less likely to be reflected onto the inner face of the windshield glass.

(2) In the vehicle interior material described in (1) above, a plurality of diffuse reflection faces may be provided on the upper face of each convexity of the grain structure. Accordingly, light incident onto the upper face of the vehicle interior material at a certain incidence angle is reflected on the plurality of diffuse reflection faces provided on each convexity at a reflection angle greater than the incidence angle.

(3) In the vehicle interior material described in (1) or (2) above, the windshield glass may be front windshield glass, and the diffuse reflection faces may be inclined toward the rear side to the front side of the vehicle.

Accordingly, light reflected on the upper face of the interior material is oriented more to the rear side than to the front windshield glass, and it is possible to reduce projection of the interior material onto the front windshield glass.

Effects of the Invention

According to the vehicle interior material described in (1) above, since the diffuse reflection face that is inclined with respect to the general upper face of the grain structure is provided on each of the convexities of the grain structure, light incident at a certain incidence angle is reflected on the diffuse reflection face on the convexity at a reflection angle greater than the incidence angle. As a result, it is possible to reduce projection of the vehicle interior material onto the windshield glass caused by the light which is reflected on the upper face of the convexity and is incident on the windshield glass.

In the case of (2) described above, since the plurality of diffuse reflection faces that are inclined with respect to the general upper face of the grain structure are provided on the upper face of each convexity of the grain structure, light incident on the upper face can be reflected on the plurality of diffuse reflection faces on the convexity at a reflection angle greater than the incidence angle. Accordingly, it is possible to reduce projection of the interior material onto the windshield glass caused by the reflected light incident on the windshield glass. In addition, in this case, since the plurality of diffuse reflection faces are provided on the upper face of each convexity, it is advantageous in that a limit on the shape and size of the convexities is reduced, which can be easily applied to various grain patterns.

In the case of (3) described above, most of the light reflected on the diffuse reflection faces is reflected more toward the rear side than to the front windshield glass. As a result, it is more difficult for the interior material to be projected onto the front windshield glass, whereby front visibility improves.

EMBODIMENTS FOR CARRYING OUT THE INVENTION

Hereinafter, each embodiment of the invention will be described based on the drawings. Furthermore, in the description below, unless otherwise specified, "upper and lower" and "front and rear" refer to upper and lower sides and front and rear sides of a vehicle, respectively.

First, a first embodiment of the invention shown in FIGS. 1 and 2 will be described.

Figure 1:
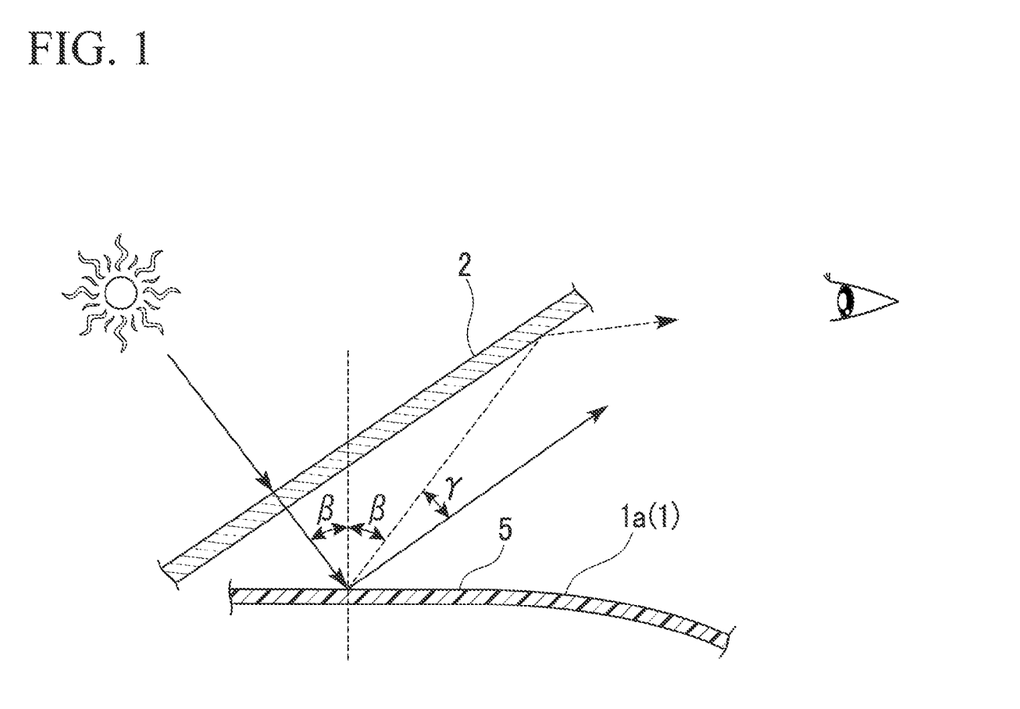
FIG. 1 is a schematic cross-sectional view of the front part of the inside of a compartment of a vehicle to which an interior material according to a first embodiment of the present invention is applied.

FIG. 1 is a schematic cross-sectional view taken when an instrument panel 1, which is a vehicle interior material, and a front windshield glass 2 are cut along the front-rear direction of the vehicle body. FIG. 2 is an enlarged cross-sectional view of the upper part of the instrument panel 1.

The front windshield glass 2 is provided to be inclined to the lower part starting from the roof of the vehicle body toward the front side of the vehicle body. The upper wall of the instrument panel 1 inside a compartment is disposed in the lower part of the front area of the front windshield glass 2. The instrument panel 1 is formed by laminating a plurality of resin panels, and grain finish is performed on the external face of a resin panel 1a in the outside of the panel in a leather pattern, a geometric pattern, or the like.

Figure 2:
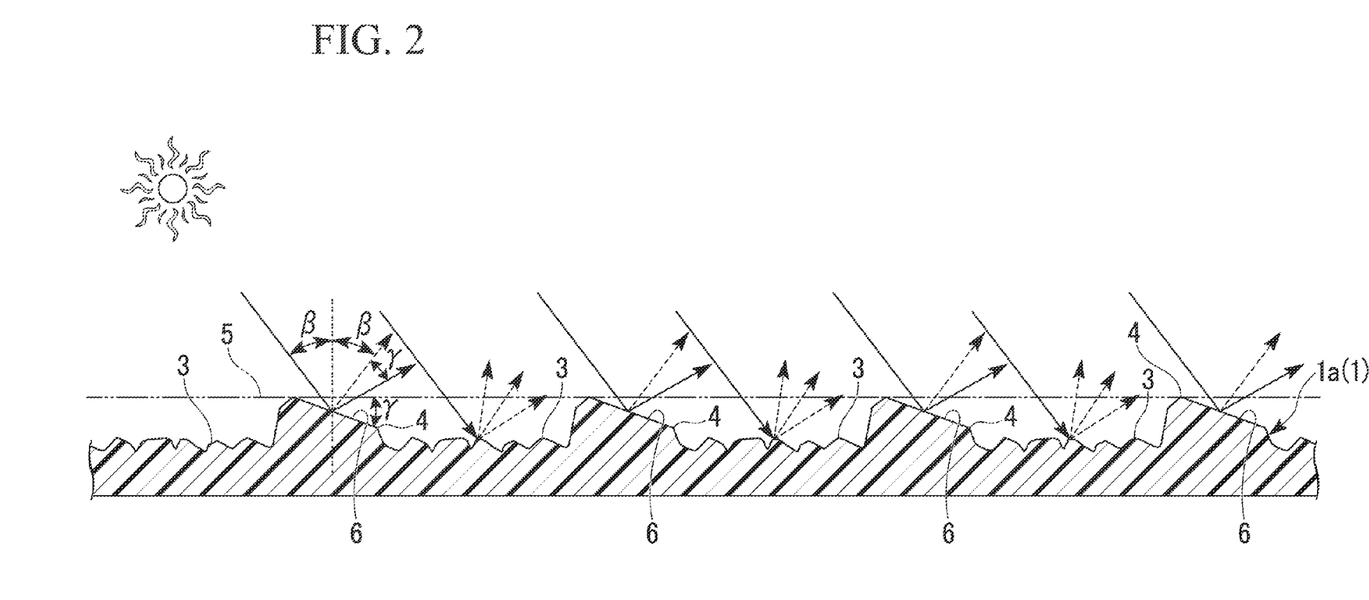
FIG. 2 is an enlarged cross-sectional view of the interior material according to the embodiment.

The grain structure in the upper face side of the resin panel 1a is as shown in FIG. 2.

The grain structure is formed by a concavity 3 that serves as the base face and a plurality of convexities 4 scattered in the concavity 3. On the upper face of the concavity 3 serving as the base face, extremely fine convexities and concavities are formed by etching. With the extremely fine convexities and concavities, the gloss value (surface glossiness) of the concavity 3 is set so as to be relatively lower than those of the convexities 4 and a concavity that is not subjected to an etching process. In addition, the upper faces of the convexities 4 undergo scratch-resistance processing. Accordingly, the gloss values of the convexities 4 are set so as to be relatively higher than those of the concavity 3 and a convexity that is not subjected to the scratch-resistance processing.

Herein, an average face of the upper face of the upper wall of the resin panel 1a as viewed in a micro manner is referred to as a general upper face 5 (refer to FIGS. 1 and 2). The upper face of each convexity 4 of the grain structure forms a diffuse reflection surface 6 where the entire upper face is inclined at a set angle γ toward the rear lower side with respect to the general upper face 5. For this reason, when light is incident on the general upper face 5 of the resin panel 1a at an incidence angle β, the light is emitted from the general upper face 5 (diffuse reflection face 6) at an emission angle of β+γ. When light is incident on the upper face of the resin panel 1a from the front side, the set angle γ of the diffuse reflection face 6 is set so that most of the light is reflected to a direction that is not oriented to the front windshield glass 2 (reflected further to the rear side than to the front windshield glass 2).

Therefore, if light reaches the diffuse reflection face 6 on the convexities 4 from the front side of the vehicle, most of the light is not reflected to the direction of the inner face of the front windshield glass 2, and the upper face of the resin panel 1a is less likely to be projected onto the front windshield glass 2. As a result, the front visibility can be improved.

The set angle γ may be set to be the same in all of the convexities 4, or may be changed according to position on the instrument panel 1. On portions positioned on the front side of the vehicle of the instrument panel 1, it is necessary to cause light to be reflected further to the rear side thereof. For this reason, it is preferable that the set angle γ of the convexities 4 formed in the front side of the vehicle be greater than a set angle γ of convexities formed in the rear side thereof. At this time, the set angle γ may be changed by stages or in a linear manner according to positions on the instrument panel 1. Accordingly, it is possible to effectively reduce the projection of the instrument panel 1 onto the front windshield glass 2 and further improve visibility.

As described above, in regard to the instrument panel 1 adopted in this embodiment, the diffuse reflection face 6 provided on the upper face of the convexity 4 causes most of the incident light to be reflected further to the rear side than to the front windshield glass 2 while setting the gloss value (surface glossiness) of the convexity 4 having the grain structure on the upper face relatively high. Therefore, it is possible to maintain highly satisfactory durability against abrasion (preventive performance against scratches or whitening), and reduce the projection of the instrument panel 1 onto the front windshield glass 2.

In addition, in the case of the embodiment, the gloss value of the convexity 4 with the grain structure is set to be relatively high, whereas the gloss value of the concavity 3 is set to be relatively low. For this reason, it is advantageous in that the stereoscopic effect of grain patterns stands out, and thus the external texture further improves.

Next, a vehicle interior material according to a second embodiment shown in FIGS. 3 to 5 will be described.

Figure 3:
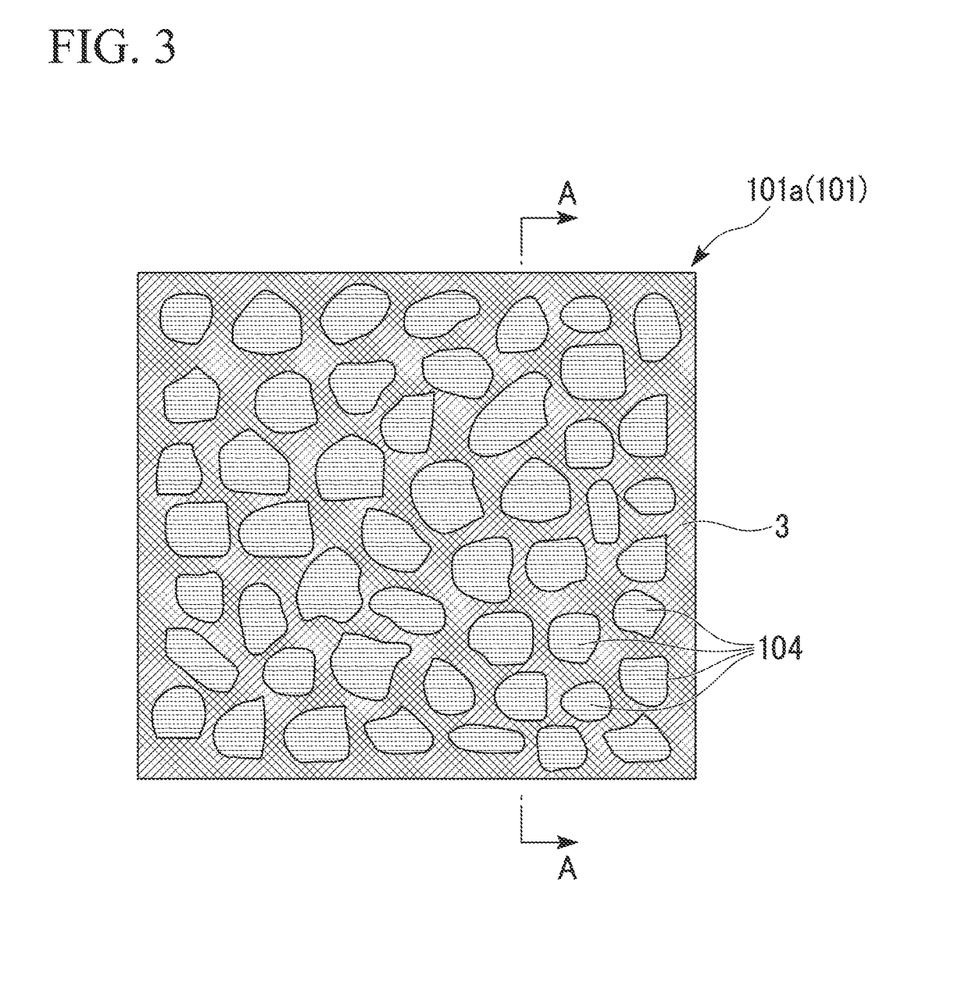
FIG. 3 is an enlarged plan view of an interior material according to a second embodiment of the invention.
Figure 4:
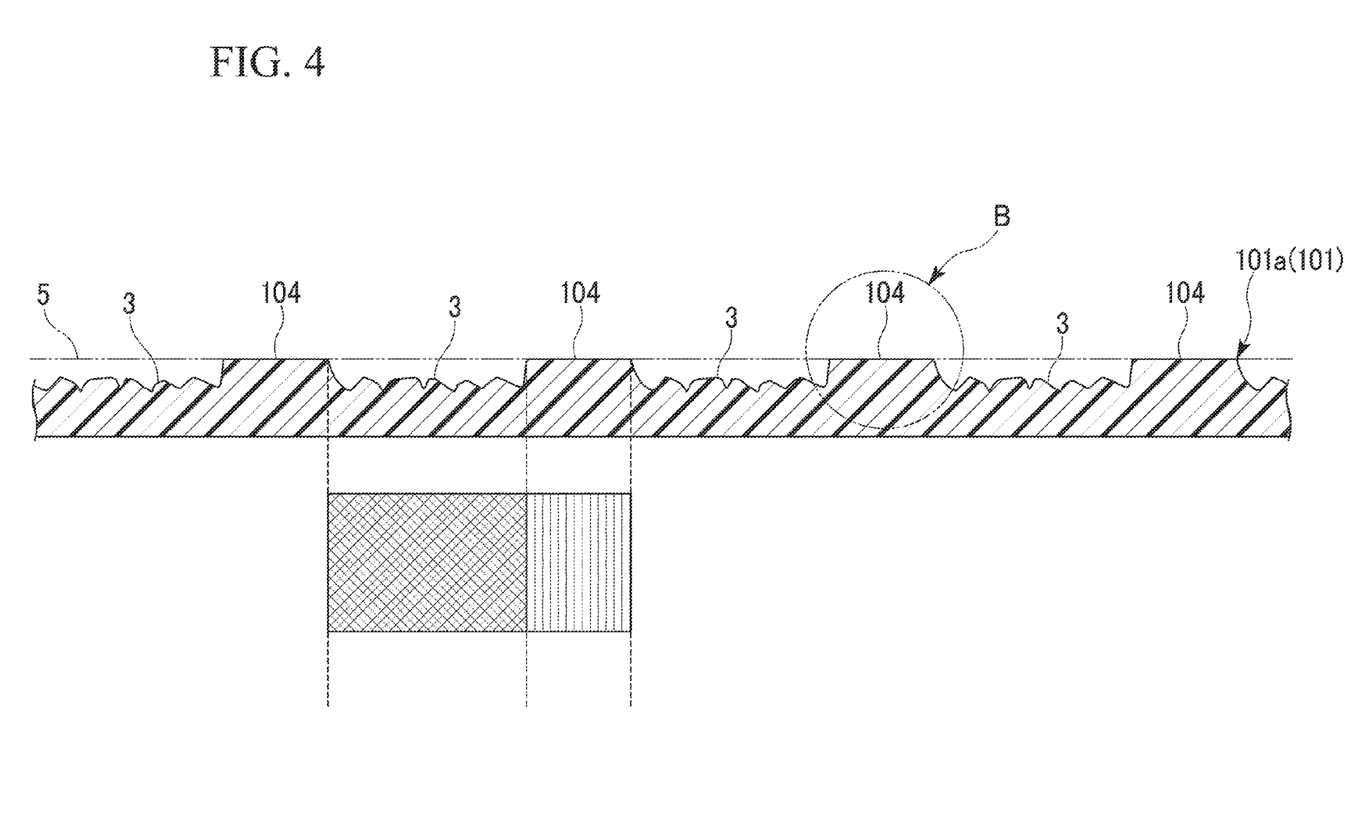
FIG. 4 is a cross-sectional view corresponding to A-A cross-section of FIG. 3 of the interior material according to the embodiment.

FIG. 3 is a view taken when the upper face of an instrument panel 101 that is a vehicle interior material is enlarged. FIG. 4 is an enlarged cross-sectional view of the upper portion of the instrument panel 101. FIG. 5 is a cross-sectional view taken by further enlarging a portion of the panel of FIG. 4.

The instrument panel 101 of the embodiment has also undergone grain finish in a leather pattern, a geometric pattern, or the like on the external face of a resin panel 101a in the outside thereof.

The grain structure of the instrument panel 101 is formed by a concavity 3 that serves as the base face and a plurality of convexities 104 that are scattered in the concavity 3, as in the first embodiment. The upper face of the concavity 3 is formed with extremely fine concavities and convexities by etching. Accordingly, the gloss value (face glossiness) of the concavity 3 is set to be relatively lower than that of the convexity 104 and a concavity that is not formed with extremely fine concavities and convexities.

On the other hand, on the upper face of each convexity 104, a plurality of diffuse reflection faces 106 that are inclined toward the rear lower side are successively formed by serration processing. Each of the diffuse reflection faces 106 is inclined toward the rear lower side forming the set angle γ with the general upper face 5 of a resin panel 101a. When light is incident on the upper face of the resin panel 101a from the front side, the set angle γ of the diffuse reflection face 106 is set so that most of the light is reflected to a direction that is not oriented to the front windshield glass 2 (reflected further to the rear side than to the front windshield glass 2).

Figure 5:
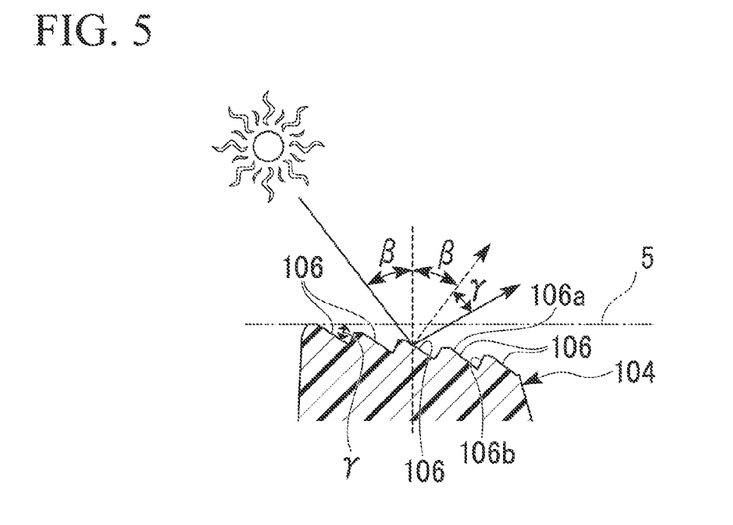
FIG. 5 is an enlarged cross-sectional view of the part B of FIG. 4 of the interior material according to the embodiment.

In regard to the plurality of diffuse reflection faces 106 provided on the upper face of each convexity 104, the faces that connect the apexes of the reflection faces 106 to each other may be set so as to be parallel with the general upper face 5, but as shown in FIG. 5, the faces that connect the apexes of the reflection faces 106 to each other may be set so as to be inclined to the lower side facing the rear side of the vehicle. In addition, it is desirable that the cross-sectional shape of a serration formed on the upper face of each convexity 104 in order to form the plurality of diffuse reflection faces 106 have substantially a triangle shape including a face 106a that is inclined to the lower side facing the rear side of the vehicle and a face 106b that is substantially orthogonal to the general upper face 5, both of which form the diffuse reflection face 106.

As described above, on the instrument panel 101 according to the present embodiment, the plurality of diffuse reflection faces 106 that are inclined to the rear lower side with respect to the general upper face 5 are provided in each convexity 104 of which the upper face has the grain structure. For this reason, most of the incident light that comes from the front side of the vehicle and reaches the upper face of the instrument panel 101 can be reflected on the plurality of diffuse reflection faces 106 further to the rear side than to the front windshield glass 2. Thus, it is possible to reduce the projection of the instrument panel 101 onto the front windshield glass 2 resulting from the reflection of light reaching the upper face of the instrument panel 101.

In addition, in the case of the embodiment, by adjusting the roughness of serration formed to provide the plurality of diffuse reflection faces 106 on the upper face of each convexity 104, it is possible to adjust the pitch and surface roughness of the formed diffuse reflection faces 106 and maintain highly satisfactory durability of the upper face of the convexity 104 against abrasion.

The set angle γ may also be set to be the same in all of the convexities 104 (diffuse reflection face 106) in the embodiment as in the above-described first embodiment, or the angle may be changed according to a position on the instrument panel 101. The effects of both cases are the same.

Figure 6:
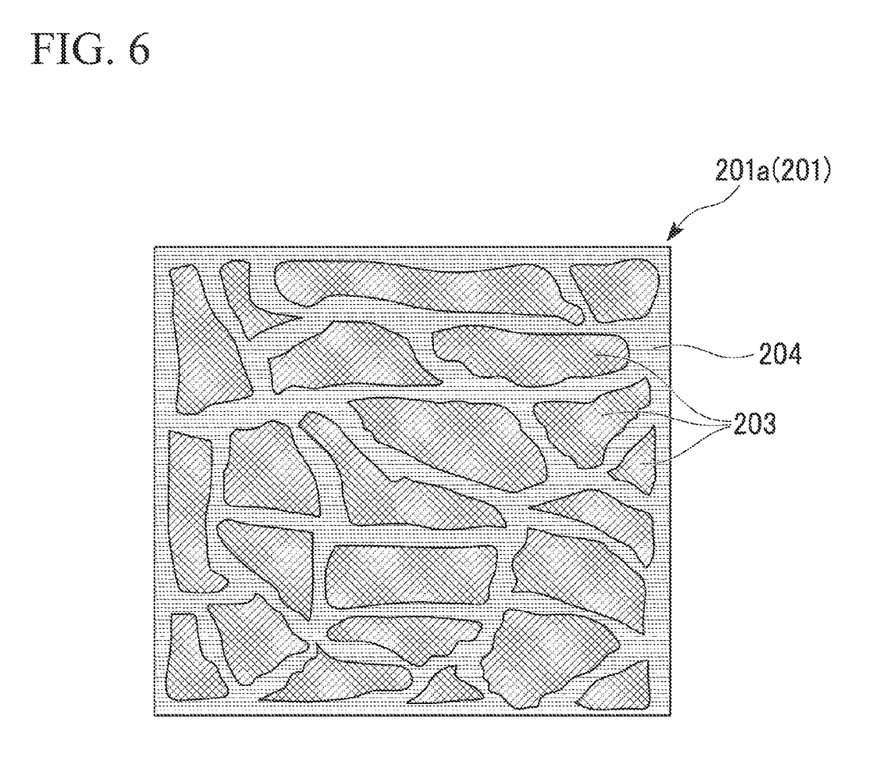
FIG. 6 is an enlarged plan view showing a modified example of the interior material according to the embodiment.

FIG. 6 is a view taken when the upper face of an instrument panel 201 that is a modified example of the second embodiment is enlarged.

The instrument panel 201 of the modified example has the base face formed by a convexity 204, and a plurality of concavities 203 are provided in the convexity 204 in a scattering manner. In other words, in this example, the plurality of concavities 203 that form the surface pattern are provided in the frame by the convexity 204. In the modified example also, extremely fine convexities and concavities are formed on the upper face of each concavity 203 by etching, and on the upper face of the convexity 204, a plurality of diffuse reflection faces (details thereof omitted in the drawing) that are inclined toward the rear lower side are successively formed.

Each diffuse reflection face is inclined to the rear lower side at a set angle with a general upper face of a resin panel 201a and most of the incident light that reaches the upper face of the instrument panel 201 is reflected more toward the rear side than to the front windshield glass 2, in the same manner as the above-described second embodiment. Thus, projection of the instrument panel 201 onto the windshield glass can be prevented also in the modified example.

As described above, in the cases of the second embodiment and the modified example of the second embodiment, the entire upper faces of the convexities 104 and 204 with the grain structure are not formed as one piece of diffuse reflection face, but the upper faces of the convexities 104 and 204 are structured to be provided with a plurality of fine diffuse reflection faces 106. For this reason, the grain structure of the embodiments can be easily applied to the continuous large-shape convexity 204 as shown in FIG. 6. Therefore, in the embodiments, it is advantageous that the embodiments can be easily applied to various grain patterns and there is a lot of flexibility in the application.

Furthermore, the invention is not limited to the embodiments described above, and can be variously designed and modified within a scope not departing from the gist of the invention. For example, in the above-described embodiment, there is the case where the vehicle interior material is set to the instrument panel 1, but the vehicle interior material applied to the invention is not limited to the instrument panel 1, but may be formed of any member if the member is one inside a compartment disposed below the windshield glass. In addition, the windshield glass is not limited to the front windshield glass, but may be glass other than in front of the seats in the front side such as door glass (particularly, front door glass), tailgate glass, or the like. In this case, the angle of a diffuse reflection face may be appropriately set so that reflected light is not oriented to each direction of the glass.

INDUSTRIAL APPLICABILITY

According to a vehicle interior material according to an embodiment of the present invention, it is possible to reduce projection of the vehicle interior material onto windshield glass, thereby improving visibility to the outside of the vehicle.

DESCRIPTION OF THE REFERENCE SYMBOLS 1, 101, 201 . . . instrument panel (vehicle interior material)
2 . . . windshield glass
3, 203 . . . concavity
4, 104, 204 . . . convexity
5 . . . general upper face
6, 106 . . . diffuse reflection face

The invention claimed is:
1. A vehicle interior material disposed in a lower side of windshield glass inside a compartment, the vehicle interior material comprising:
a grain structure comprising concavities and convexities on the upper face thereof,
wherein the convexities of the grain surface each include a diffuse reflection face that is inclined with respect to a general upper face of the grain structure, wherein said diffuse reflection faces of said convexities are formed at set angles relative to said general upper surface of said grain structure, and wherein said set angles corresponding to convexities formed at a front side of the material are greater than said set angles corresponding to convexities formed at a rear side of the material.

2. The vehicle interior material according to claim 1, wherein a plurality of diffuse reflection faces are provided on the upper face of each convexity of the grain structure.

3. The vehicle interior material according to claim 1, wherein the windshield glass is front windshield glass, and the diffuse reflection faces are inclined from the front side of the vehicle toward the rear side of the vehicle.

* * * * *